Aug. 28, 1962 R. J. STROZEWSKI 3,051,221
FORMER FOR BEAD BUILDING MACHINES OR THE LIKE
Filed Nov. 24, 1958 3 Sheets-Sheet 1

INVENTOR.
Richard J. Strozewski,
BY
Attys.

Aug. 28, 1962 R. J. STROZEWSKI 3,051,221
FORMER FOR BEAD BUILDING MACHINES OR THE LIKE
Filed Nov. 24, 1958 3 Sheets-Sheet 2

INVENTOR.
Richard J. Strozewski,
BY
Atty's.

Aug. 28, 1962    R. J. STROZEWSKI    3,051,221
FORMER FOR BEAD BUILDING MACHINES OR THE LIKE
Filed Nov. 24, 1958    3 Sheets-Sheet 3
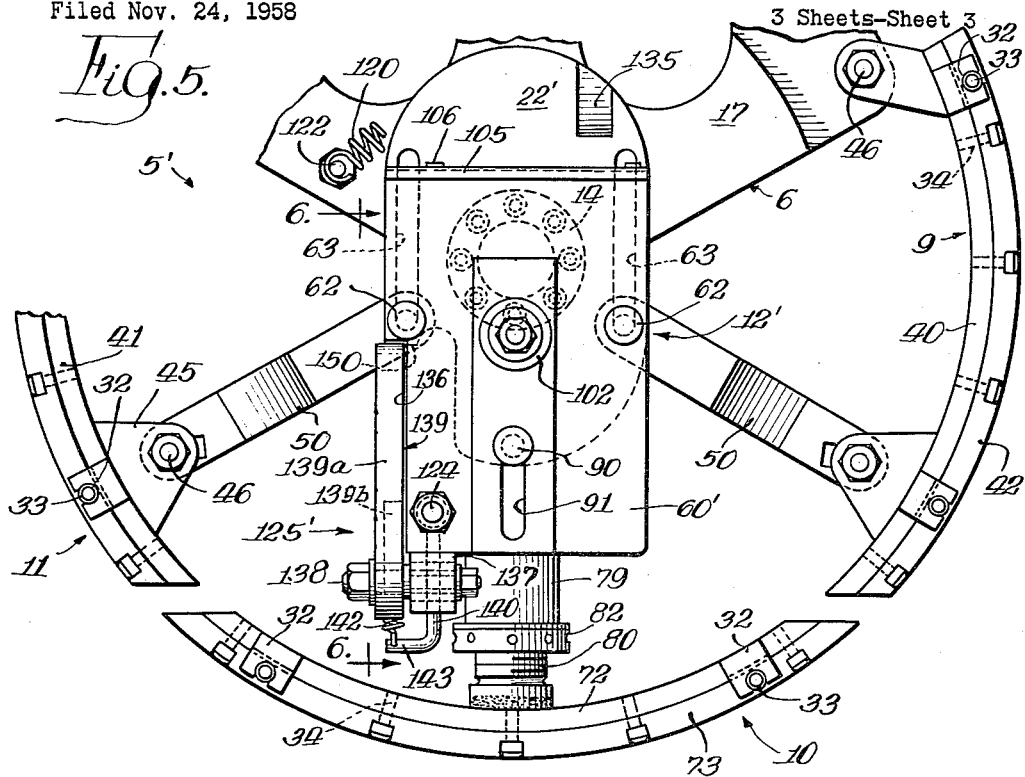
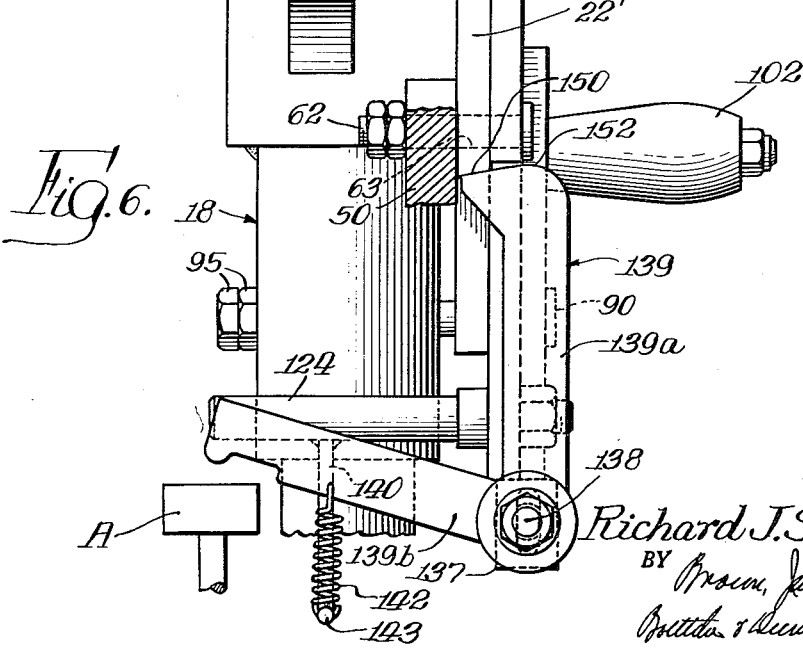
INVENTOR.
Richard J. Strozewski,

United States Patent Office 3,051,221
Patented Aug. 28, 1962

3,051,221
FORMER FOR BEAD BUILDING MACHINES
OR THE LIKE
Richard J. Strozewski, South Bend, Ind., assignor to National-Standard Company, Niles, Mich., a corporation of Delaware
Filed Nov. 24, 1958, Ser. No. 775,749
11 Claims. (Cl. 156—422)

This invention relates to a former having utility for forming material into loop form, and more particularly to devices for forming tire bead material into tire beads.

Most tire bead building machines employ a former of drum-like configuration mounted on a rotating shaft, to which bead material from a suitable source of supply is secured at one end to the drum so that in the rotation of the latter successive convolutions of the bead material are formed into a tire bead. After the bead is formed it is then removed from the former. In many of such formers, the outer periphery is provided with a peripheral groove extending radially inwardly so that upon completion of the tire bead the drum must be collapsed to remove the completed bead. Known constructions of such formers have several disadvantages residing in, for example, the structural arrangement for securing the lead end of the bead material to the former, and physical limitations for adequately collapsing the drum to affect the easy removal of a completed tire bead. The difficulties last mentioned have been due at least, in part, by the practice of the art in providing a former of several circumferentially disposed former segment members one of which is employed to serve as a clamp for securing the end of the bead material to the former, and, additionally, are movable to positions to enable removal of a completed tire bead, which dual functions are not suitably compatible to provide an end structure satisfactorily meeting both of the requirements noted.

It is an object of my invention to provide a former of simple construction affording the ready and easy collapsing of the same to enable convenient removal of a completed tire bead.

A further object of my invention is to provide a former embodying bead gripper means of simple design, and which is conveniently actuated in the collapsing and expanding of the former for securing, upon expansion, the leading end of bead material for the building of a tire bead, and releasing the leading end of such material upon completion of the bead and after initial collapsing of the former has occurred.

A further object is to provide a former including fixed and movable former segment means having peripheral grooves, and which former segments are positionable relative to each other so that the grooves thereof lie substantially on a path of predetermined contour to conform to the desired shape of bead to be formed thereon.

A further object is to provide a former as last aforesaid including former segment means disposed in fixed position on the frame for the former, and having bead gripper means associated therewith for gripping the leading end of bead material to be used in forming a bead.

A further object is to provide a former having a frame and hub for mounting the same for rotation, and including fixed former segment means and a pair of movable former segment means, each of the former segment means having peripheral grooves, and arranged so that one movable former segment means is pivotally mounted to dispose its peripheral groove on or within substantially a circular path outwardly of the hub and in which the other movable segment means is movable radially inwardly and outwardly of the hub to dispose its peripheral groove substantially on or within such circular path.

A further object is to provide a former as last noted in which actuating means is carried by the frame of the same for movement relative thereto to effect movement of the movable segment means to dispose the groove means thereof on or inwardly of a circular path defined by the groove means of the fixed former segment means.

A further object is to provide a former including fixed former segment means and a plurality of movable former segment means, and in which the actuating means is arranged to effect sequential movement of the movable former segments with respect to each other.

A further object is to provide lock means operable normally to retain the several former segment means in position in which the peripheral grooves thereof lie on a substantially circular path of predetermined radius from the rotational axis of the hub of the former.

A further object is to provide a former as last aforesaid including adjustment means to provide for varying the radius of the substantially circular path defined by the peripheral grooves of the former segments.

A further object is to provide a former including actuating means as above noted operable to release the bead gripper means upon collapsing movement of the movable former segments to remove a completed bead from the former.

The above and other objects and advantages of my invention will appear from the following detailed description.

Now in order to acquaint those skilled in the art with the manner of constructing and utilizing a former built in accordance with the principles of my present invention, I shall describe in connection with the accompanying drawings certain preferred embodiments of my invention.

In the drawings:

FIGURE 4 is a detail sectional view through locking means embodied in the former of the aforementioned figures with the view being taken substantially along the line 4—4 of FIGURE 1 and looking in the direction indicated by the arrows;

Figure 1:
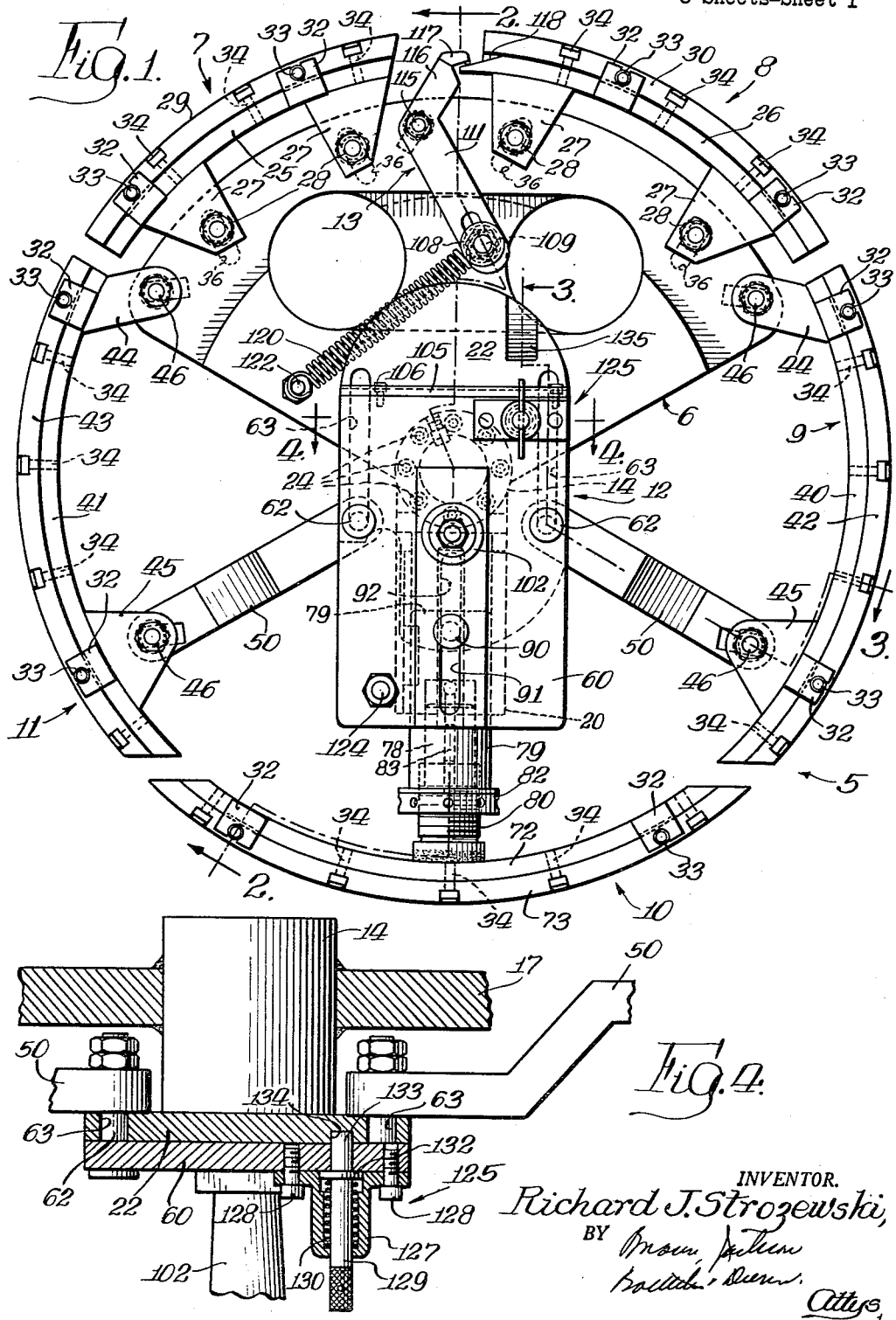
FIGURE 1 is a front elevational view of one embodiment of a former constructed in accordance with the principles of the present invention.

FIGURE 5 is a partial front elevational view of another embodiment of a former constructed incorporating a modified form of locking means in accordance with the principles of the present invention; and FIGURE 6 is a detail sectional view through the locking means embodied in the former shown in FIGURE 5 with the view being taken substantially along the line 6—6 of FIGURE 5, and looking in the direction indicated by the arrows.

The former 5 shown in FIGURES 1 through 4 of the drawings comprises essentially a main frame or base structure indicated at 6, a plurality of arcuate former segment means, which in the embodiments of the invention herein disclosed are five in number, shown at 7, 8, 9, 10 and 11, actuating means for collapsing and expanding the former generally identified by reference numeral 12 and bead gripper means 13.

The main frame or base structure 6 includes a center hollow hub member 14, which is adapted to be keyed on the driven shaft (not shown) of a bead making machine to effect rotation of the former. A main frame plate 17, substantially of sector configuration, is secured at its inner edge portion to the periphery of hub member 14. Substantially diametrically opposite plate 17, a guide housing 18, including spaced front and rear walls 19 and 20, respectively, is also secured as by welding to the outer periphery of the hub member 14. A front guide plate 22 is secured to the forward end of hub 14 by a plurality of cap screws 24 to complete the frame, and which plate member also serves as a component, as will later appear of actuating means 12.

The former segments 7 and 8 as shown are secured in fixed relation outwardly of the periphery of sector plate 17. The stationary former segments 7 and 8 each comprise arcuate stationary segment frame elements 25 and 26 having brackets 27, one adjacent each of the ends thereof, and which bracket members 27 are secured to the sector plate 17 by bolt and nut means indicated at 28.

Figures 2, 3:
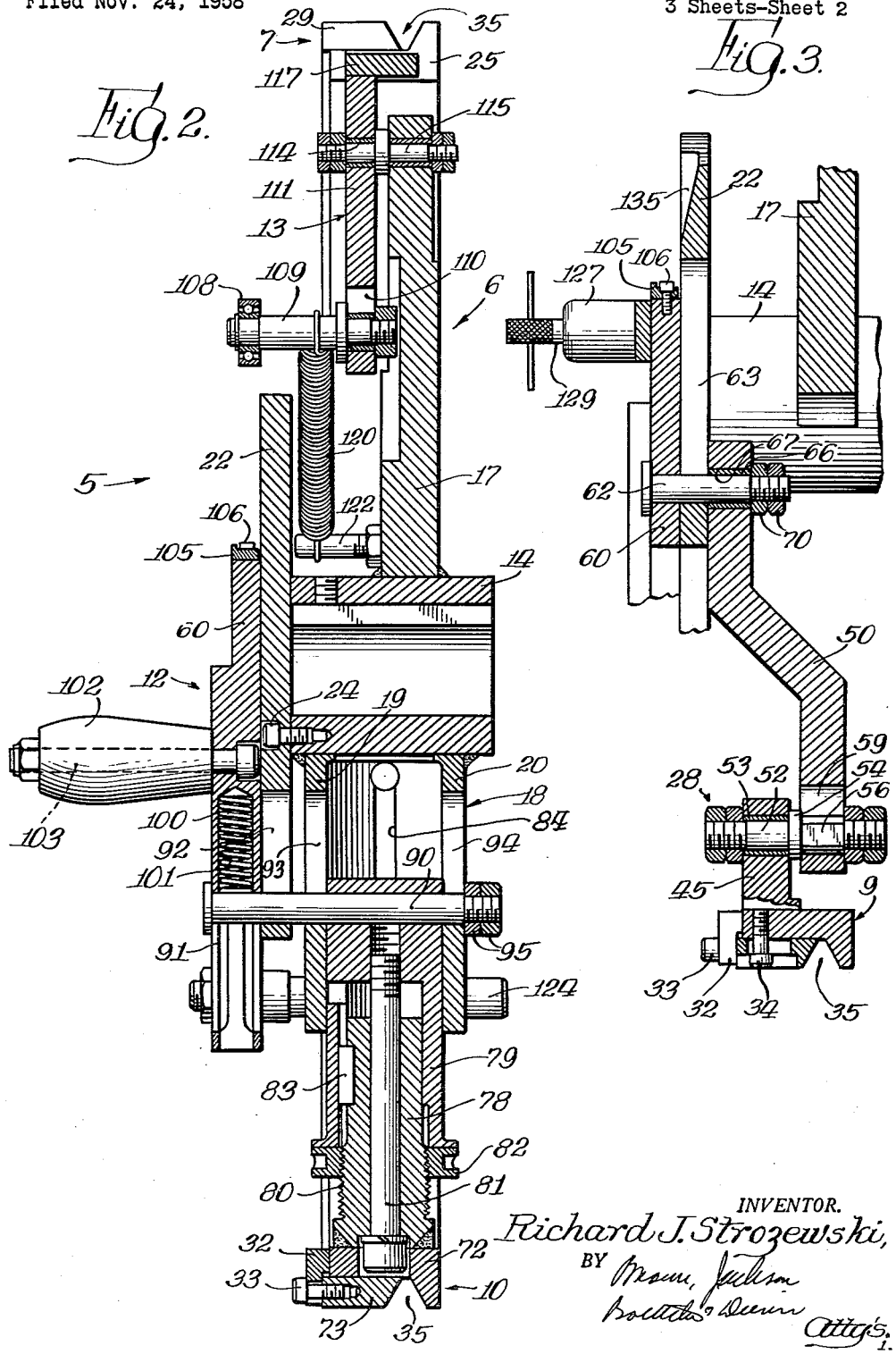
FIGURE 2 is a transverse cross-sectional view taken of the former of FIGURE 1 taken along line 2—2 of the latter and looking in a direction indicated by the arrows.
FIGURE 3 is a detail sectional view taken substantially along line 3—3 of FIGURE 1 and looking in a direction indicated by the arrows.

The former segments 7 and 8 further comprise arcuate removable segment frame elements 29 and 30 associated, respectively, with the stationary frame elements 25 and 26. Also, as best seen in FIGURES 1 and 3, gauge plates 32 are secured to the removable frame elements 29 and 30 by cap screws 33 having threaded shank portions extending through slots in the gauge plate and into threaded engagement with the removable frame elements. The assembly of the removable frame elements 29 and 30 and the gauge plates 32 are made fast to the stationary frame elements 25 and 26 by a plurality of cap screws 34 extending through slotted openings in the removable frame elements 29 and 30 for threaded engagement with the stationary frame elements 25 and 26 and the gauge plates by engagement with the stationary frame elements afford appropriate positioning of the removable frame elements with respect to the stationary frame elements to define a bead material receiving groove 35. The opposed surfaces of the stationary and movable segment frame elements in the embodiment of the invention shown are tapered to form a substantially V-shaped groove 35 within which a bead is to be formed. It will be observed that by the construction described that gauge plates 32 of varied undercut portions may be utilized to provide a desired width for the bottom of groove 35 and thus position removable frame elements 29 and 30 in appropriate positions for clamping by cap screws 34. It will be understood that the cross-sectional shape of the groove 35 is not material to the former construction of the present invention and is shown only by way of example. In the embodiment shown the arcuate segment frames 25 and 26 and the removable frame elements 29 and 30 are suitably formed so as to provide for the positioning of the aforementioned arcuate groove 35 on a circular path of predetermined radius from the rotational axis of hub member 14 outwardly of the hub member. It will be seen that the sector plate 17 is provided with elongated slots 36 so that the bolt means 28 for securing the brackets 27 of the former segment to the main frame may be adjusted inwardly and outwardly of the hub 14 to provide for the disposal of the arcuate grooves of the former segments 7 and 8 in predetermined position with respect to the axis of the hub 14.

The former 5 in the position shown in FIGURE 1 of the drawings is its normal position at the start or completion of the making of a tire bead, and with this position as a point of reference it will be observed that the two former segments 7 and 8 may be considered to be at the top of the former 5. In the following description of my invention to side and bottom former segments, it will be understood that such references relate to the position of the former as shown in FIGURE 1. The two side former segments 9 and 11 are in large part the same as the former segments 7 and 8, and each comprise arcuate stationary segment frames 40 and 41, respectively, and arcuate removable segment frames 42 and 43 secured, respectively, to the arcuate segment frames 40 and 41. Gauge plates 32 and attaching cap screws 33 and 34 are incorporated with the former segments 9 and 11 in the manner already described. The former segments 9 and 11 also include upper end mounting brackets 44 which are adjustably mounted adjacent the outer upper corners of sector plate 17 by nut and bolt means 46. Lower end mounting brackets 45 for the former segments 9 and 11 have adjustable connection with the outer ends of pivot brackets 50 again by conventional nut and bolt means such as shown at 46. As will be best seen in FIGURE 3, such nut and bolt means 46 may comprise a bolt 52 journalled in bushing 53 mounted in bracket 45 which in its instance provides a pivot for former segment 9. A spacer collar 54 lies between bracket 45 and the adjacent end of the pivot bracket 50, and, as shown, the portion 56 of bolt 52 lying in the slot 59 of the pivot bracket 50 is flattened to prevent turning of the bolt relative to slot 59. By virtue of the construction noted, the brackets 44 and 45 may be adjusted relative to sector plate 17 and the outer ends of the pivot brackets 50, respectively, and thus provide for adjusting the positions of former segments 9 and 11 relative to hub 14. The inner ends of the pivot brackets 50 as shown are secured to the outer plate member 60 of actuating means 12 by pivot anchor pins 62. The pivot anchor pins 62 as best seen in FIGURE 3 lie in vertical slots 63 in guide plate 22 with the inner end portions of the anchor pins being pivotally mounted in bushings 66 in openings 67 at the inner ends of pivot brackets 50. Nuts 70 are threaded on the inner ends of the anchor pins 62, as shown, to retain them in assembled position. The former segments 9 and 11 are thus pivotally mounted at their upper ends on the frame plate sector 17 and their other or lower end portions are movable inwardly towards the hub 14 of former 5 by movement of pivot anchor pins 62 in slots 63 of guide plate 22. The reason for the aforedescribed mounting of former segments 9 and 11 will be referred to hereinafter. In the position of former segments 9 and 11 shown in the drawing, it will be understood that the arcuate grooves 35 defined by the segment frame elements thereof are disposed to lie substantially in circumferential alignment with and substantially on the circular path of the arcuate grooves of the stationary former segments 7 and 8.

The former 5 is further provided with a bottom sliding former segment 10 which, similarly to the former segments previously described, comprises an arcuate segment frame element 72, a removable arcuate segment frame element 73, gauge plates 32, and cap screws 33 and 34, as above described. The bottom former segment 10 as shown, includes, as best seen in FIGURE 2, a threaded plug 78 mounted in a slide block 79, which in turn is mounting for sliding movement in guide housing 18 for movement radially inwardly and outwardly of the axis of rotation of hub 14. The outer end of plug 78 is welded to arcuate segment frame 72 centrally of the ends of the latter. An elongated cap screw 81 extends through plug 78 and has threaded engagement with slide block 79. The plug 78 is provided with a threaded portion 80 with which lock nut 82 engages for abutting engagement with the outer end of block 79 adjusting the position of plug 78 with respect to slide block 79 and, accordingly for selectively positioning the bottom former segment 10 intermediate side former segments 9 and 11 with the groove 35 of the bottom former segment substantially in alignment with the grooves 35 of the latter and on the circular path aforesaid. A key 83 is preferably provided between block 79 and plug 78 and second key means is provided between slide block 79 and guide housing 18 including slot 84 in the latter which serves to prevent rotation of the bottom former segment 10 so as to retain the same in correct planar relationship with respect of the remaining former segments of the former 5. A lifting pin 90 for the bottom former segment 10, as shown, extends through slot 91 of plate member 60, slot 92 at the bottom of guide plate 22, and slots 93 and 94, respectively, formed in the front and rear walls of guide housing 18. A pair of nuts 95 at the outer threaded end of pin 90 secure it in position.

As already observed, the actuating means 12 comprises the rectangular plate member 60, and further includes, as best seen in FIGURE 2, a coil spring 100 disposed in a bore 101 above slot 91, and which spring 100 in the position of the parts shown in the latter figure, in compressed relation between lifting pin 90 and the closed inner end of the bore. A handle 102 is suitably secured to the plate 60 by bolt means 103. The upper edge of plate member 60 has secured thereto a roller plate 105 by a pair of cap screws 106. The roller plate 105 as will appear in the following description of operation of the device is adapted to have engagement with a ball bearing wheel 108 carried by a shaft or pin 109 extending through slot 110 at the one arm of bell crank 111 of the bead gripper means 13. The bell crank 111 as shown is pivotally mounted at 114 on a pin 115 supported in a bushing in the sector plate 17, and the other arm 116 of the bell crank carries a clamp member 117 adapted to have clamping engagement with the adjacent outer arm end surface 118 of the arcuate segment frame 26 of former segment 8. A coil spring 120 is secured at one end to pin 109 and at its other end is anchored on pin 122 mounted in the sector plate 17. The pin 109 as shown is mounted for movement in slot 110 in the adjacent outer end of the lower arm of bell crank 111. It will be seen that the spring 120 normally biases the bell crank lever 111 about its rotational axis 114 in a clockwise direction to engage normally the clamp 117 with the clamp surface 118 of former segment 8. The plate 60 of actuating means 12 also carries an operating rod 124, the purpose of which will be referred to hereinafter.

Former 5 further includes locking means, indicated generally at 125, comprising a spring cap housing 127 suitably secured to plate member 60 by cap screws 128. A plunger member 129 is disposed within the housing 127 and a coil spring 130 within the housing bears against an enlarged flange 132 of pin 129 and outer end of housing 127 to bias normally the inner end 133 of pin 132 into engagement with an opening 134 formed in guide plate 22. Thus in the position of the parts shown in the drawing, the locking means 125 retains plate member 60 in the position shown with respect to the guide plate 22.

In the position of the parts of the former as shown in the drawings, the several former segments 7 through 11 are all disposed so that the peripheral grooves 35 thereof lie on a circular path of predetermined radius from the rotational axis of the hub 24. In this position of the parts and with the lead end of bead material secured between clamp surface 118 of former segment 8 by the clamp 117 of bead gripper means 13, rotation of the former in a counter-clockwise direction as viewed in FIGURE 1 effects the winding of successive convolutions of bead material in the groove to form a bead. After wire of the amount desired to form the bead has been thus wound on the former, the former comes to rest preferably in the position shown in FIGURE 1. The bead machine in such sequence of operation may then include cam or other suitable means for engaging the actuating rod 124 to urge or move plate member 60 of actuating means 12 vertically upwardly. Simultaneously pin 129 of the locking means 125 is withdrawn freeing end 133 of the pin 129 from engagement with the guide plate 22. In the upward vertical movement of plate 60, pins 62 at the inner ends of pivot brackets 50 cause the lower ends of former segments 9 and 11 to move inwardly of the circular path defined by the groove means of the several former segments. In such movement, the slots 63 afford lost motion connection with the pins 62 and in such movement the former segments 9 and 11 are caused to pivot about pins 46 at the brackets 44 to thus dispose the groove means 35 of the former segments 9 and 11 to a position inwardly of the circular path of their expanded positions. After such movement of the segment formers 9 and 11 has been initiated, the plate member 60 in its further upward movement engages the bottom end of slot 91 so as to then effect upward movement of lifting pin 90, and which upward movement is transmitted to block 79 and plug 78 to move the bottom former segment 10 radially inwardly toward the hub 14 of the former. The previously described lost motion connections afforded by slot 92 in the guide plate 22, and slots 93 and 94 in the guide housing 18 permit the aforesaid movement of the bottom former segment 10 radially inwardly of the former to dispose its arcuate groove within the circular path defined by the several former segments of their expanded positions.

Upon further vertical upward movement of plate 60 of actuating means 12, the roller plate 105 is brought into engagement with roller 108 of the bead gripper means 13 causing the bell crank 111 to rotate in a counter-clockwise direction (as viewed in FIGURE 1) about its pivot 115 to release clamping engagement of clamp 117 of the bell crank with the cooperating clamping surface 118 of former segment 8 so as to release the formed bead segment. When the several parts are in the positions last described, the completed bead ring may then be readily removed from its supported position on the pair of fixed former segments 7 and 8. After removal of the completed bead, the leading end of the bead material may then be disposed to lie on surface 118 in position to be engaged by the clamp 117, and upon return of plate 60 of the actuating means 12 to the position indicated in the drawings, the several former segments are disposed in their expanded positions for forming another bead. In that the end 133 of the locking plunger 129 progresses beyond the outer end of guide plate 22 in collapsing the former, I have provided a cam surface 135 in the upper end portion of guide plate 22 to engage the end portion 133 to move plunger 129 in a direction inwardly of housing 127 and compress spring 130 so that when the end 133 is opposite the opening 134 therefore in guide plate 22, spring 130 effects the actuation of the locking device to retain the parts in expanded position. The actuating means 12 and locking means 125 may, of course, be actuated manually by grasping handle 102 and the outwardly projecting plunger 129, respectively.

In FIGURES 5 and 6 there is shown another embodiment of former 5' of the present invention similar in major respects to the aforedescribed former 5 except for the substitution of modified form of locking means 125' for locking means 125. All parts of former 5' identical with the parts of former 5 bear identical reference numerals and the parts bearing primed reference numerals are similar to correspondingly numbered parts of the first described embodiment modified as below described to accommodate locking means 125'.

In former 5' actuating means 12' includes an outer plate member 60' modified to include a cut-out portion 136 at one side thereof and further includes a bearing or bushing member 137 secured at its bottom edge below pin 124 as by welding or the like. The bearing or bushing 137 provides for the support of a latch pivot pin 138 which at one end thereof pivotally supports a bell crank latch 139 having one arm 139a adapted to lie in one position of latch 139 in the cut-out 136 of outer plate member 60' and its other arm 139b in position to be engaged at its outer end by a latch actuating member A. The latch actuating member A is a component of the bead building machine with which the former is employed and per se forms no part of the former. The latch pivot pin 138 is preferably mounted in an elongated slot formed in the bearing or bushing 137 to provide for adjustment of the latch as will presently appear. An anchor pin 140 is suitably secured at one end to and depends from actuating rod 124, and a coil spring 142 is anchored at one end to the outer end of 143 of the pin 140 with the spring at its opposite end being connected inwardly of the outer end of arm 139b of the bell crank latch 139 inwardly of the front guide plate 22' which as previously described is secured to the forward end of hub 14 of the former is formed with an inclined shoulder 150 in position to be engaged by the outer end surface 152 of arm 139a of the bell crank latch 139.

In the position of the parts shown in FIGURE 6, it will be observed that the spring 142 biases bell crank latch 139 in a counter-clockwise direction about latch pivot pin 138 to yieldingly retain latch surface 152 in engagement with the shoulder 150 of front guide plate 22'. Thus, in the position of the parts illustrated in FIGURES 5 and 6, actuating means 12' is restrained against movement relative to front guide plate 22' and provides for locking of the several former segments in position relative to each other so that the grooves thereof lie substantially in the path of a circle and in position for the forming of a tire bead thereon upon rotation of the former. In the utilization of former 5', upon completion of a tire bead in the manner already above described in connection with the first embodiment of my invention, the tire bead building machine by suitable means (not shown) effects movement of latch tripping member A in a direction to engage the outer end of arm 139b of the bell crank latch 139 rocking the latter in a clockwise direction about pivot 138 and freeing the end surface 152 of the bell crank latch from shoulder 150 of the front guide plate. In continued movement of member A it engages actuating rod 124 to collapse the former. Thus, upon release of the locking means 125' between outer plate member 60' of actuating means 12' from engagement with front guide plate 22' the former may be collapsed in the manner already above described in connection with former 5 of FIGURES 1 through 4. As before, former 5' may be collapsed by manipulates of handle 122 upon releasing locking means 125'.

While I have shown and described what I consider to be preferred embodiments of my invention, it will be understood that various modifications and rearrangements may be made herein without departing from the spirit and scope of the invention.

I claim:

1. A former for a machine of the class described comprising, frame means including a hub member, first former segment means fixedly mounted on said frame means and having an arcuate groove in the periphery thereof lying outwardly of said hub member and substantially in a circular path of predetermined radius from the rotational axis of said hub member, second former segment means having an arcuate groove of substantially the same radius as the radius of the arcuate groove of said first former segment means, pivot means for mounting one end of said second former segment means on said frame means for movement of said second former segment means relative to said first former segment means to position the arcuate groove of said second former segment means substantially on or within said circular path, bracket means pivotally connected at one end to the other end of said second former segment means, and actuating means connected with the other end of said bracket means and mounted on said frame means for straight line reciprocating movement to dispose, selectively, said second former segment means in its aforesaid positions.

2. A former for a machine of the class described comprising, frame means including a hub member, first former segment means fixedly mounted on said frame means and having an arcuate groove in the periphery thereof lying outwardly of said hub member and substantially in a circular path of predetermined radius from the rotational axis of said hub member, second former segment means having an arcuate groove of substantially the same radius as the radius of the arcuate groove of said first former segment means, means for pivotally mounting one end of said second former segment means on said frame means to position the arcuate groove thereof on or within said circular path, third former segment means having an arcuate groove of substantially the same radius as the radius of the arcuate grooves of said first and second former segment means, and means for mounting said third former segment means on said frame means for movement radially inwardly and outwardly of said hub member to dispose the arcuate groove thereof substantially on or within said circular path, bracket means pivotally connected at one end to the other end of said second former segment means, and actuating means connected with the other end of said bracket means and with said third former segment means and movable relative to said frame means to dispose, selectively, said second and third former means in their aforesaid positions.

3. A former for a machine of the class described comprising, frame means including a hub member, first former segment means fixedly mounted on said frame means and having an arcuate groove in the periphery thereof lying outwardly of said hub member and substantially in a circular path of predetermined radius from the rotational axis of said hub member, second former segment means having an arcuate groove of substantially the same radius as the radius of the arcuate groove of said first former segment means, means for pivotally mounting one end of said second former segment means on said frame means to position the arcuate groove thereof substantially on or within said circular path, third former segment means having an arcuate groove of substantially the same radius as the radius of the arcuate grooves of said first and second former segment means, and means for mounting said third former segment means on said frame means for movement radially inwardly and outwardly of said hub member to dispose the arcuate groove thereof substantially on or within said circular path, bracket means pivotally connected at one end with the other end of said second former segment means, actuating means connected with the other end of said bracket means, and including a lost motion connection means connecting said actuating means with said third former segment means, and said actuating means being operable when said second and third former segment means are positioned with the arcuate grooves thereof on said circular path through said lost motion connection means to first move said second segment means to dispose its arcuate groove inwardly of said circular path, and subsequently to move said third former segment means radially inwardly to dispose its arcuate groove inwardly of said circular path.

4. A former for a machine of the class described comprising, frame means including a hub member, a plurality of former segment members circumferentially disposed about and having arcuate grooves in the peripheries thereof adapted to be disposed to lie substantially in a circular path of predetermined radius from the rotational axis of said hub member, means for mounting an adjacent first pair of said former segment members in fixed relation on said frame means with the grooves thereof lying substantially on said circular path, means for pivotally mounting on said frame means a second pair of said former segment members, one adjacent each of said first pair of segment former members, for movement to dispose the grooves thereof on or inwardly of said circular path, means for mounting another of said segment members on said frame means between said second pair of segment members for movement radially inwardly and outwardly of said hub member to dispose the peripheral groove thereof substantially on or inwardly of said circular path, and actuating means connected with said second pair of former segment members and including lost motion connecting means with said another former segment member operable, when said first and second pairs of segment members and said another segment member are positioned with the arcuate grooves thereof on said circular path, to first move said second pair of former segment members to dispose their arcuate groove inwardly of said circular path, and subsequently to move said another segment member radially inwardly to dispose its arcuate groove inwardly of said circular path.

5. A former for a machine of the class described comprising, frame means including a hub member, first, second and third former segment means circumferentially disposed about said hub member and having arcuate peripheral groove means adapted to be disposed to lie in a substantially circular path of predetermined radius from the rotational axis of said hub member, means for mounting said first former segment means on said frame means in fixed relation with the groove means thereof lying substantially on said circular path, means for pivotally mounting one end of said second former segment means on said frame means for movement to dispose the groove means thereof substantially on or within said circular path, bracket means pivotally connected with the other ends of said second former segment means, means for mounting said third former segment means on said frame means for movement radially inwardly and outwardly of said hub member to dispose the groove means of the same substantially on or inwardly of said circular path, actuating means mounted on said frame means for movement relative thereto, and means connecting said actuating means with said bracket means, and lost motion connection means between said actuating means and said third former segment means to afford, when said first, second and third former segment means are disposed with the groove means thereof lying on said circular path, pivotal movement of said second former segment means to dispose the groove means thereof inwardly of said circular path, and, subsequently to afford movement of said third segment means radially inwardly to dispose the groove means thereof inwardly of said circular path.

6. A former for a machine of the class described comprising, frame means including a hub member, first, second and third former segment means circumferentially disposed about said hub member and having arcuate peripheral groove means adapted to be disposed to lie in a substantially circular path of predetermined radius from the rotational axis of said hub member, means for mounting said first former segment means on said frame means in fixed relation with the groove means thereof lying substantially on said circular path, means for pivotally mounting one end of said second former segment means on said frame means for movement to dispose the groove means thereof substantially on or within said circular path, bracket means pivotally connected at one end with the other end of said second former segment means, means for mounting said third segment means on said frame means for movement radially inwardly and outwardly of said hub member to dispose the groove means of the same substantially on or inwardly of said circular path, actuating means mounted on said frame means for movement relative thereto, means connecting said actuating means with the other end of said second former segment means, and lost motion connection means between said actuating means and said third former segment means to afford, when said first, second and third former segment means are disposed with the groove means thereof lying on said circular path, pivotal movement of said second segment means to dispose the groove means thereof inwardly of said circular path, and subsequently to afford movement of said third former segment means radially inwardly to dispose the groove means thereof inwardly of said circular path, and locking means between said actuating means and said frame means to retain said second and third former segment means with the grooves thereof lying on said circular path.

7. A former for a machine of the class described comprising, frame means including a hub member, first, second and third former segment means circumferentially disposed about said hub member and having arcuate peripheral groove means adapted to be disposed to lie in a substantially circular path of predetermined radius from the rotational axis of said hub member, means for mounting said first former segment means on said frame means in fixed relation with the groove means thereof lying substantially on said circular path, means for pivotally mounting one end of said second former segment means on said frame means for movement to dispose the groove means thereof substantially on or within said circular path, bracket means pivotally connected at one end with the other end of said second former segment means, means for mounting said third former segment means on said frame means for movement radially inwardly and outwardly of said hub member to dispose the groove means of the same substantially on or inwardly of said circular path, actuating means mounted on said frame means for movement relative thereto, means connecting the other end of said bracket means with said actuating means, and lost motion connection means between said actuating means and said third former segment means to afford, when said first, second and third former segment means are disposed with the groove means thereof lying on said circular path, pivotal movement of said second former segment means to dispose the groove means thereof inwardly of said circular path, and subsequently to afford movement of said third former segment means radially inwardly to dispose the groove means thereof inwardly of said circular path, and adjusting means for said first, second and third former segment means for varying the radius of the circular path defined by the grooves of said former segment means.

8. A former for a machine of the class described comprising, frame means including a hub member, first, second and third former segment means circumferentially disposed about said hub member and having arcuate peripheral groove means adapted to be disposed to lie in a substantially circular path of predetermined radius from the rotational axis of said hub member, means for mounting said first former segment means on said frame means in fixed relation with the groove means thereof lying substantially on said circular path, means for pivotally mounting one end of said second former segment means on said frame means for movement to dispose the groove means thereof substantially on or within said circular path, bracket means pivotally connected at one end with the other end of said former segment means, means for mounting said third segment means on said frame means for movement radially inwardly and outwardly of said hub member to dispose the groove means of the same substantially on or inwardly of said circular path, actuating means mounted on said frame means for movement relative thereto, and means connecting said actuating means with the other end of said bracket means, and lost motion connection means between said actuating means and said third former segment means to afford, when said first, second and third former segment means are disposed with the groove means thereof lying on said circular path, pivotal movement of said second former segment means to dispose the groove means thereof inwardly of said circular path, and subsequently to afford movement of said third former segment means radially inwardly to dispose the groove means thereof inwardly of said circular path, bead gripper means carried by said frame means for securing bead material to said first former segment means, and means carried by said actuating means for engaging said bead gripper means to actuate the same.

9. A former for a machine of the class described comprising, frame means including a hub member, first, second and third former segment means circumferentially disposed about said hub member and having arcuate peripheral groove means adapted to be disposed to lie in a substantially circular path of predetermined radius from the rotational axis of said hub member, means for mounting said first former segment means on said frame means in fixed relation with the groove means thereof lying on said circular path, means for pivotally mounting one end of said second former segment means on said frame means for movement to dispose the groove means thereof substantially on or within said circular path, bracket means pivotally connected at one end with the other end of said second former segment means, means for mounting said third former segment means on said frame means for movement radially inwardly and outwardly of said hub member to dispose the groove means of the same on or inwardly of said circular path, actuating means mounted on said frame means for movement relative thereto, means connecting said actuating means with the other end of said bracket means, and lost motion connection means between said actuating means and said third former segment means to afford, when said first, second or third former means are disposed with the groove means thereof lying on said circular path, pivotal movement of said second former means to dispose the groove means thereof inwardly of said circular path, and subsequently to afford movement of said third segment means radially inwardly to dispose the groove means thereof inwardly of said circular path, locking means between said actuating means and said frame means to retain said first, second and third former segment means with the grooves thereof lying on said circular path, said locking means including retractable spring loaded pin means for disengaging said actuating means and said frame means to afford, upon movement of said actuating means relative to said frame means, to dispose said second and third former segment means with their grooves inwardly of said circular path, and cam means for said frame means for engaging said pin means to dispose the same in position to lock with said frame means when said actuating means is positioned to dispose said second and third former segment means with their grooves lying on said circular path.

10. The former of claim 5 characterized by said second and third former segment means having slot and pin connection with said frame means.

11. In a former for a machine of the class described including frame means, former segment means mounted for movement relative to said frame means to an expanded position and to a collapsed position, and actuating means mounted for relative sliding movement on and with respect to said frame means, the combination of locking means between said frame means and said actuating means comprising an abutment shoulder for said frame means, a bell crank latch pivoted on said actuating means for movement into and out of engagement with said abutment shoulder to dispose, selectively, said former segment means in expanded or collapsed positions, and spring means connecting an arm of said bell crank latch with said actuating means to bias said bell crank latch in a direction for engaging said abutment shoulder.

References Cited in the file of this patent
UNITED STATES PATENTS

| | | |
|---|---|---|
| 1,389,439 | De Mattia | Aug. 30, 1921 |
| 1,451,837 | McClenathen | Apr. 17, 1923 |
| 1,571,404 | Gardocky | Feb. 2, 1926 |
| 1,575,925 | Maranville | Mar. 9, 1926 |
| 1,876,375 | Wikle | Sept. 6, 1932 |
| 2,151,306 | Shook | Mar. 21, 1939 |
| 2,382,672 | Shook | Aug. 14, 1945 |